(12) United States Patent
Roberge

(10) Patent No.: US 11,041,439 B2
(45) Date of Patent: Jun. 22, 2021

(54) HYBRID EXPANDER CYCLE WITH TURBO-GENERATOR AND COOLED POWER ELECTRONICS

(71) Applicant: United Technologies Corporation, Farmington, CT (US)

(72) Inventor: Gary D. Roberge, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 139 days.

(21) Appl. No.: 16/131,716

(22) Filed: Sep. 14, 2018

(65) Prior Publication Data

US 2020/0088099 A1    Mar. 19, 2020

(51) Int. Cl.
| | | |
|---|---|---|
| F02C 7/143 | (2006.01) | |
| F02C 3/22 | (2006.01) | |
| F02C 7/224 | (2006.01) | |
| F02C 9/40 | (2006.01) | |

(52) U.S. Cl.
CPC ............... *F02C 7/143* (2013.01); *F02C 3/22* (2013.01); *F02C 7/224* (2013.01); *F02C 9/40* (2013.01)

(58) Field of Classification Search
CPC .... F02C 3/22; F02C 7/12; F02C 7/143; F02C 7/16; F02C 7/18; F02C 7/224; F02C 9/40; F05D 2260/211
See application file for complete search history.

(56) References Cited

U.S. PATENT DOCUMENTS

| | | |
|---|---|---|
| 4,531,357 A | 7/1985 | Weber et al. |
| 5,161,365 A | 11/1992 | Wright |
| 8,042,343 B2 | 10/2011 | Jarlestad |
| 9,341,119 B2 | 5/2016 | Rhoden |
| 9,546,576 B2 | 1/2017 | Campbell et al. |
| 9,765,691 B2 | 9/2017 | Delgado et al. |
| 9,932,124 B2 | 4/2018 | Kamath et al. |

(Continued)

FOREIGN PATENT DOCUMENTS

| | | |
|---|---|---|
| EP | 3290651 A1 | 3/2018 |
| GB | 2531775 A | 5/2016 |
| WO | WO9942706 A1 | 8/1999 |

OTHER PUBLICATIONS

Printout from Wikipedia, "Liquid Hydrogen", accessed at https://en.wikipedia.org/wiki/Liquid_hydrogen on Sep. 12, 2020 (Year: 2020).*

(Continued)

*Primary Examiner* — Scott J Walthour
(74) *Attorney, Agent, or Firm* — Kinney & Lange, P.A.

(57) ABSTRACT

A gas turbine engine system includes a gas turbine engine and a turbo-generator. The gas turbine engine includes a heat exchange system configured to transfer thermal energy from an air flow (i.e., inlet air flow or exhaust gas flow) to a fuel to produce a gaseous fuel. The turbo-generator includes a fuel turbine fluidly coupled to the heat exchange system and a combustor of the gas turbine engine, a fuel pump configured to be driven by the fuel turbine and fluidly coupled to the heat exchange system, and a motor/generator configured to be driven by the fuel turbine. The fuel turbine is configured to extract energy from expansion of the gaseous fuel to produce a gaseous fuel for combustion in the combustor. The motor/generator includes a cooling jacket, which is fluidly coupled to the fuel pump.

15 Claims, 2 Drawing Sheets

(56) References Cited

U.S. PATENT DOCUMENTS

| | | | |
|---|---|---|---|
| 2008/0185924 A1* | 8/2008 | Masoudipour | H02K 5/20 |
| | | | 310/54 |
| 2011/0239650 A1* | 10/2011 | Amedick | F01D 15/10 |
| | | | 60/670 |
| 2014/0182264 A1 | 7/2014 | Weisgerber et al. | |
| 2016/0105078 A1* | 4/2016 | Santini | F16H 47/02 |
| | | | 290/52 |
| 2017/0268507 A1* | 9/2017 | Ribarov | F04C 2/18 |
| 2018/0191262 A1 | 7/2018 | Caiafa | |

OTHER PUBLICATIONS

Extended European Search Report for EP Application No. 19197595.2, dated Jan. 29, 2020, 6 pages.

\* cited by examiner

HYBRID EXPANDER CYCLE WITH TURBO-GENERATOR AND COOLED POWER ELECTRONICS

BACKGROUND

The present disclosure relates generally to a gas turbine engine of an aircraft and more specifically to a gas turbine engine using non-traditional cooled liquid fuel to fuel the engine, cool electronics, and drive a turbo-generator.

Aircraft engines are being simultaneously challenged to provide increases in thermal efficiency, electrical power generation (e.g., in excess of 1 MW), and thermal management, while reducing environmental emissions. Shaft power extraction impacts sizing of turbomachinery components and can have an adverse impact on performance and operability. Thermal management (e.g., providing a heat sink for engine and external systems) is limited by engine internal temperatures and can result in excessive pressure losses as heat is rejected using heat exchangers or other devices. Thermal efficiency improvement trends typically involve providing a higher overall pressure ratio (OPR) of the compression system with associated increases in compressor discharge pressure (P3) and accompanying temperature (T3). The OPR is increased by increasing a compressor discharge pressure (P3). As pressure increases across the compressor, temperature also increases. Current aircraft designs are generally limited by operational temperature limits of materials used for gas turbine structures. While emission reductions in NOx, as well as carbon monoxide and particulates is desirable, it often runs counter to desired cycle characteristics and can be difficult to achieve with current hydrocarbon fuels.

SUMMARY

In one aspect, a gas turbine engine system includes a gas turbine engine and a turbo-generator. The gas turbine engine includes an air inlet configured to receive an inlet air flow; a compressor configured to compress the inlet air flow to produce a compressed air flow; a combustor fluidly coupled to the compressor and configured to combust a mixture of the compressed air flow and a gaseous fuel at a first pressure to produce a combustion gas flow; a turbine fluidly coupled to the combustor and configured to extract energy from expansion of the combustion gas flow to produce an exhaust gas flow; and a heat exchange system configured to transfer thermal energy from an air flow (i.e., inlet air flow or exhaust gas flow) to a fuel to produce the gaseous fuel at a second pressure greater than the first pressure. The turbo-generator includes a fuel turbine fluidly coupled to the heat exchange system and the combustor, a fuel pump configured to be driven by the fuel turbine and fluidly coupled to the heat exchange system, and a motor/generator configured to be driven by the fuel turbine. The fuel turbine is configured to extract energy from expansion of the gaseous fuel at the second pressure to produce the gaseous fuel at the first pressure. The motor/generator includes a cooling jacket, which is fluidly coupled to the fuel pump.

In another aspect, a method of operating a gas turbine engine system includes cooling an air flow of the gas turbine engine via a first heat exchanger to produce a cooled air flow and compressing the cooled air flow to produce a compressed air flow. The cooling process includes transferring thermal energy to a liquid fuel. The liquid fuel is vaporized to produce a gaseous fuel. Energy is extracted from expansion of the gaseous fuel through a fuel turbine. Expansion of the gaseous fuel produces a gaseous fuel having a pressure greater than a pressure of the compressed air flow. A mixture of the gaseous fuel from an outlet of the fuel turbine and the compressed air flow is combusted in a combustor of the gas turbine engine. The method also includes cooing a combined motor/generator, which is driven by the fuel turbine.

In yet another aspect, a turbo-generator system includes a fuel turbine configured to extract energy from expansion of a gaseous fuel, a fuel pump configured to be driven by the fuel turbine and to deliver a liquid fuel, a motor/generator configured to be driven by the fuel turbine, with the motor/generator including a cooling jacket fluidly coupled to the fuel pump and configured to cool the motor/generator with the liquid fuel.

The present summary is provided only by way of example, and not limitation. Other aspects of the present disclosure will be appreciated in view of the entirety of the present disclosure, including the entire text, claims, and accompanying figures.

Figure 1:
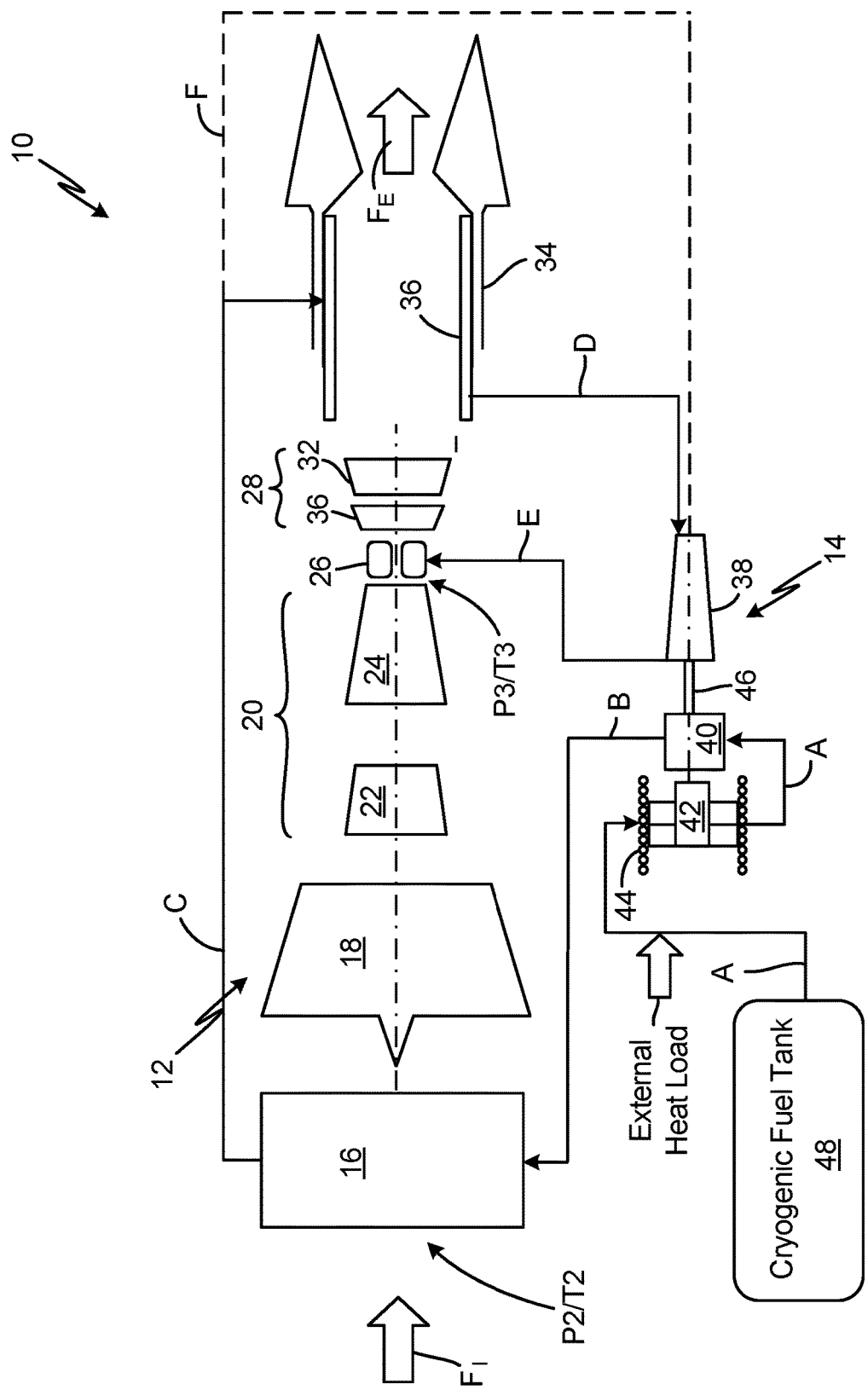
FIG. 1 is a schematic diagram of one embodiment of a gas turbine engine system with a turbo-generator and power electronic cooling system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure combines the use of a non-traditional fuel, such as methane or hydrogen, stored in a cooled liquid state to cool power electronics and drive a hybrid cycle of a gas turbine engine system—the hybrid cycle consisting of a conventional Brayton cycle with pre-compression inlet air cooling and/or compressor intercooling and an expander cycle, which utilizes waste heat added to the fuel to drive a turbo-generator to provide electrical power generation. The integrated propulsion and power system enables utilization of high electrical conductivity, low electrical resistance components in a power generation subsystem. Reduced temperature and associated reduction in electrical resistance of key power electronic components enables reduced system losses or increased system efficiency, reduced system weight, and reduced system envelope or size. Use of fuel as a heat sink removes the need for separate cooling systems and incorporation of the expander cycle enables energy to be extracted from waste heat to drive the electrical power generator. Electrical generation using regenerative (i.e., waste heat) input can be provided with reduced impact on turbomachinery sizing, performance, and operability The disclosed embodiments are directed to a military-style gas turbine engine with a low bypass ratio cycle, however, it will be appreciated that the disclosed systems could be adapted for use in commercial aircraft engines with a high bypass ratio. In the cooled liquid state, the fuel provides a heat sink for power electronics and potential for cooling air flow entering and/or within the gas turbine engine. The fuel can be further heated by exhaust gas waste heat of the gas turbine engine to form a high-pressure gaseous fuel, which is used to drive a multi-stage fuel turbine, liquid fuel pump, and motor/generator, which is cooled by the liquid fuel. Fuel expanded through the multi-stage fuel turbine is then used in the gas turbine engine for combustion.

FIG. 1 is a schematic diagram of one embodiment of gas turbine engine system 10 with pre-compression cooling and expander cycle. System 10 includes gas turbine engine 12 and turbo-generator 14. Gas turbine engine 12 includes inlet heat exchanger 16, fan section 18, compressor section 20 (including low pressure compressor (LPC) 22 and high pressure compressor (HPC) 24), combustor section 26, turbine section 28 (including high pressure turbine (HPT) 30 and low pressure turbine (LPT) 32), exhaust case 34, and exhaust heat exchanger 36. Fan section 18 drives inlet air flow $F_f$. Compressor section 20 draws air in along a core flow path where air is compressed and communicated to combustor section 26. In combustor section 26, air is mixed with fuel and ignited to generate a high-pressure combustion exhaust gas stream that expands through turbine section 28 where energy is extracted and utilized to drive fan section 18 and compressor section 20.

Although the disclosed non-limiting embodiment depicts a turbofan gas turbine engine, it should be understood that the concepts described herein are not limited to use with turbofans as the teachings may be applied to other types of turbine engines, including, for example, a turbine engine including a three-spool architecture. While the present disclosure focuses on utilization of a twin spool, axial flow gas turbine fan-jet military-style engine, it will be appreciated that it has utility in other types of engines, such as straight jets (turbojets), turboshafts and engines used in nonmilitary, and high speed applications (e.g., commercial supersonic transport). Furthermore, utility expands to hybrid propulsion systems combining a gas turbine engine driven generator to power one or more electrically driven propulsors. In this embodiment the fuel cooling of power electronics may also be extended to cool electrically driven motors used to drive said propulsors with associated benefits in component sizing and efficiency.

Turbo-generator 14 includes fuel turbine 38, fuel pump 40, and motor/generator 42 with cooling jacket 44. Fuel turbine 38 is a multi-stage turbine with multiple stages of turbine blades driven by the expansion of high-pressure gaseous fuel. Fuel turbine 38, fuel pump 40, and motor/generator 42 are coupled to rotor shaft 46 such that fuel pump 40 and motor/generator 42 are mechanically driven by the rotation of fuel turbine 38. Fuel pump 40 is configured to deliver fuel through system 10. Motor/generator 42 can be configured to supply power for system 10 components and/or other engine systems and power needs.

System 10 additionally includes fuel tank 48 configured to contain a cryogenic fuel and a series of conduits (e.g., fuel lines A-D) configured to deliver the fuel in liquid and/or gaseous phase via fuel pump 40 through system 10. System 10 can additionally include a plurality of valved fuel lines to control the flow of fuel through system 10 via a controller, a plurality of temperature and/or pressure sensors configured to detect a temperature and/or pressure of the fuel at various locations in system 10 or air flow through gas turbine engine 12, fuel sensors configured to detect fuel leakage from inlet heat exchanger 16 or exhaust heat exchanger 36, an auxiliary fuel tank configured to deliver an auxiliary supply of gaseous fuel to combustor 26, and intermediate inlet and exhaust heat exchangers configured to transfer thermal energy to the fuel via a working fluid. The additional components are disclosed in the patent application titled, "Hybrid Expander Cycle with Pre-compression Colling and Turbo-generator" (concurrently filed with the present application), which is incorporated by reference in its entirety.

System 10 is configured for use with gas turbine engines operating at high speed (i.e., supersonic speeds typically >Mach 2) with inlet air temperatures generally exceeding 250° F. By providing inlet air cooling with inlet heat exchanger 16, system 10 allows OPR/thermal efficiency gains to be established independent of vehicle speed and inlet air temperature T2. In addition to improving thermal efficiency of gas turbine engine 12, system 10 can be configured to reduce emissions as compared to engines that burn traditionally used fossil fuels, and to generate power for operating components of system 10, including fuel pump 40, as well as other engine systems, from heat supplied by inlet air flow and/or exhaust gas from gas turbine engine 12. Furthermore, system 10 can be used to cool power electronics, reducing the need for separate cooling systems and enabling reduced system losses and increased system efficiency.

As illustrated in FIG. 1, a cryogenic liquid fuel is stored in fuel tank 48 at low temperature and pressure. Suitable fuels can include, but are not limited to, liquefied natural gas (LNG) and liquid hydrogen. Tank 48 can be configured in any manner and made of any material suitable for storing cryogenic fuels as known in the art. The temperature of the fuel is sufficiently low to provide cooling of inlet air and power electronics, but can vary significantly depending on system 10 configuration, inlet heat exchanger 16 configuration, and inlet air temperature T2. For example, inlet air temperature T2 at Mach 3 can be greater than 630° F. (332° C.). Generally, it will be desired to reduce the inlet air temperature T2 to 250° F. (121° C.) or less. In one non-limiting example, liquid hydrogen fuel stored at −425° F. (−254° C.) and 25 psi (172 kPa) can be used effectively for inlet air cooling at Mach 3 operating conditions.

Before being directed to inlet heat exchanger 16, liquid fuel is circulated through electronic cooling jacket 44 on motor/generator 42. Extreme low temperatures (typically below −375° F. (−226° C.)) can significantly reduce system losses by reducing electric resistance and thereby increasing conductivity toward achieving superconductivity for some materials. Generally, power electronics operating at cryogenic temperatures can have a reduced volume and weight as compared to electronics operated at higher temperatures and producing the same amount of power because the cryogenic cooling can replace larger heat exchangers that conventional, non-superconductive systems, employ to maintain component temperatures under various thermal limits. Various known materials used in electrical components exhibit a dramatic reduction in electrical resistance and corresponding increase in electrical conductivity as they are cooled to extreme low temperatures. As these materials approach a superconductive state where electrical resistance approaches zero, they also undergo significant changes with respect to their magnetic properties and magnetic fields generated as they transfer electrical current. The significant reduction in electrical resistance results in a significant reduction in waste heat generation. As such, electrical motor, generators, and power electronics can be designed without the need for the external heat exchangers used in conventional systems.

Fuel pump 40 is configured to pump liquid fuel from tank 48 through fuel line A through cooling jacket 44. Cooling jacket 44 can be configured in any manner suitable for providing adequate heat transfer between motor/generator 42 and the liquid fuel. The temperature of the liquid fuel increases as it absorbs thermal energy from motor/generator 42. As will be appreciated, system 10 can be designed in a manner such that the temperature of the fuel remains low enough to provide adequate cooling for inlet air cooling.

Fuel pump 40 pumps the liquid fuel received from fuel tank 48 and cooling jacket 44 to inlet heat exchanger 16 though fuel line B. In some embodiments, liquid fuel is used as a heat sink for vehicle or external heat load (e.g., avionics), as illustrated in FIG. 1. Pump 40 increases the pressure of liquid fuel entering inlet heat exchanger 16. In some non-limiting embodiments, the pressure of fuel entering inlet heat exchanger 16 from fuel pump 40 can be in excess of 550 psi (3,792 kPa). It will be understood by one of ordinary skill in the art to design pump 40 and the fuel circuit of system 10 to provide effective circulation of the fuel through system 10. Liquid fuel can be pumped to inlet heat exchanger 16 when inlet air cooling is needed. Generally, inlet heat exchanger 16 is needed only during high speed flight when inlet air temperatures exceed 250° F. (121° C.) and generally is not needed during takeoff and subsonic flight or when temperatures are below 250° F. (121° C.). A valve (not shown) on fuel line B can be used to control fuel flow into inlet heat exchanger 16 based on aircraft operation. Inlet heat exchanger 16 is positioned in a primary inlet of gas turbine engine 12 and configured to substantially cover the primary inlet to provide cooling to a substantial portion of inlet air while also allowing passage of inlet air. Inlet heat exchanger 16 can be a plate-fin, shell-and-tube, or other suitable air-to-liquid heat exchanger as known in the art. To substantially cover the primary inlet to gas turbine engine 12, inlet heat exchanger 16 can have a web-like or grid-like configuration with a network of cooling channels extending radially, crosswise, and/or in concentric rings over the primary inlet to provide cooling to a substantial portion of inlet air entering gas turbine engine 12.

Inlet heat exchanger 16 is configured to place inlet air flow $F_1$ and liquid fuel in thermal communication such that thermal energy from the inlet air is transferred to the liquid fuel. The temperature of fuel exiting inlet heat exchanger 16 can vary depending on the temperature of the fuel and inlet air entering inlet heat exchanger 16. Depending on the conditions, the fuel may remain in a liquid state or may vaporize when heated by inlet air. In some embodiments, gaseous fuel exiting inlet heat exchanger 16 can be delivered through fuel line F (shown in phantom) directly to turbo-generator 14 to drive fuel turbine 38. If additional heat is required, fuel exiting inlet heat exchanger 16 can be pumped through fuel line C to exhaust heat exchanger 36 where heat from exhaust gas exiting gas turbine engine 12 can be transferred to the fuel.

Exhaust heat exchanger 36 can be a plate-fin, shell-and-tube, or other suitable air-to-liquid heat exchanger as known in the art. In some embodiments, exhaust heat exchanger 36 can be disposed in an exhaust case wall of gas turbine engine 12 and heat can be transferred through a wall to fuel circulating in tubing coiled or otherwise distributed around the exhaust case, as shown in FIG. 1. Exhaust heat exchanger 36 is configured to heat fuel from inlet heat exchanger 16 with waste heat from the exhaust gas of gas turbine engine 12. During some operations exhaust gas can have a temperature greater than 1500° F. (816° C.) and in excess of 3200° F. (1760° C.) when an augmentor (not shown) is utilized. In a non-limiting example, fuel exiting exhaust heat exchanger 36 and entering fuel turbine 38 can have a temperature of about 1300° F. (704° C.) and pressure of about 515 psi (3,551 kPa).

Fuel directed to turbo-generator 14 through fuel lines D or F expands through multi-stage fuel turbine 38, driving rotation of fuel turbine 38 and thereby fuel pump 40 and motor/generator 42, which can be located on common shaft 46 or otherwise mechanically coupled. Gaseous fuel exiting fuel turbine 38 can be supplied to combustor 26 through fuel line E. Fuel turbine 38 is configured to maximize turbine work extraction, while providing a fuel pressure sufficient to overcome an operating pressure P3. As such, the pressure of gaseous fuel exiting fuel turbine 38 must be greater than the pressure P3 of compressed air entering combustor 26. Fuel turbine 38 can be sized to deliver the gaseous fuel at a pressure greater than P3. In some embodiments, fuel turbine 38 can include an interstage discharge outlet 50 to enable discharge of fuel at a higher pressure than complete turbine discharge would provide as one element of a control mechanism to ensure the pressure of fuel delivered to combustor 26 exceeds P3.

Fuel turbine 38 drives fuel pump 40 and motor/generator 42, which are mechanically coupled to fuel turbine shaft 46. Fuel pump 40 produces a continuous cycling of fuel through system 10. Motor/generator 42 can be used to provide power to engine systems and components, including components of system 10. In some embodiments, motor/generator 42 can be used to drive fuel pump 40 when fuel turbine 38 is not in operation. In addition, power extracted or input from motor generator 42 can be varied as one element of a control architecture used to ensure fuel discharge pressure from fuel turbine 38 is adequate to overcome P3.

Figure 2:
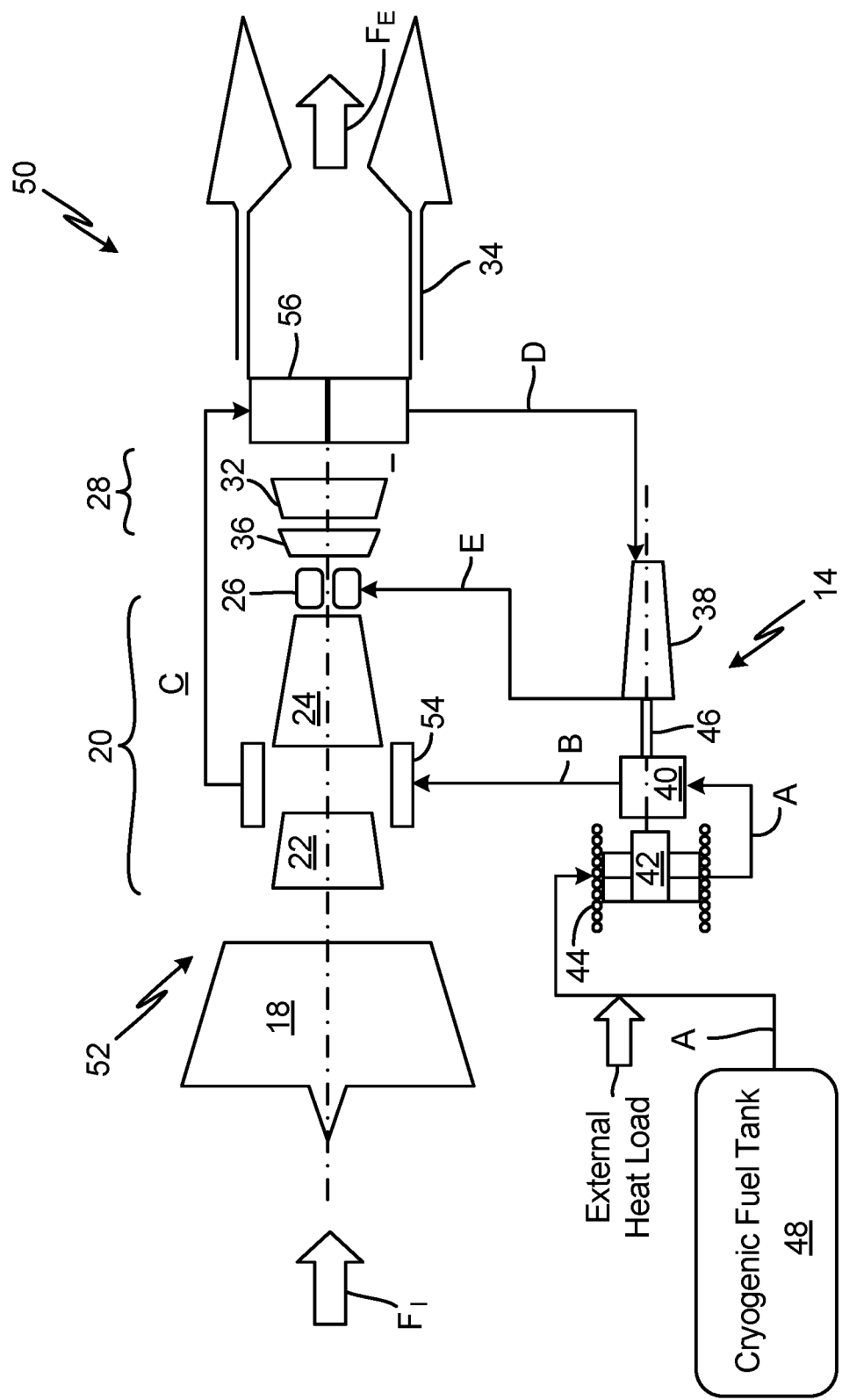
FIG. 2 is a schematic diagram of another embodiment of a gas turbine engine system with the turbo-generator and power electronic cooling system of FIG. 1.

FIG. 2 is a schematic diagram of an alternative embodiment of a gas turbine engine system with turbo-generator and power electronic cooling system. FIG. 2 illustrates gas turbine engine system 50, which is configured to provide compressor intercooling to enable a higher OPR. Gas turbine engine system 50 includes turbo-generator 14 of system 10 with a modified gas turbine engine 52, in which intercooler 54 replaces inlet heat exchanger 16 of system 10 and exhaust heat exchanger 56 replaces exhaust heat exchanger 36 of system 10.

Intercooler is configured to place compressed air exiting LPC 20 and liquid fuel in thermal communication such that thermal energy from the compressed air is transferred to the liquid fuel. LPC 22 draws air in along a core flow path where air is compressed and communicated to intercooler 54, which cools the compressed air before delivery to HPC 24. The cooled compressed air is further compressed in HPC 24 and communicated to combustor section 26. In combustor section 26, the compressed air is mixed with fuel and ignited to generate a high-pressure combustion exhaust gas stream that expands through turbine section 28 where energy is extracted and utilized to drive fan section 18 and compressor section 20.

As described with respect to system 10, system 50 additionally includes fuel tank 46 and a plurality of fuel conduits (fuel lines A-E) with slight modification as will be discussed further. System 50 can additionally include a plurality of valved fuel lines to control the flow of fuel through system 10 via a controller, a plurality of temperature and/or pressure sensors configured to detect a temperature and/or pressure of the fuel at various locations in system 50 or air flow through gas turbine engine 52, fuel sensors configured to detect fuel leakage from intercooler 54 or exhaust heat exchanger 56, an auxiliary fuel tank configured to deliver an auxiliary supply of gaseous fuel to combustor 26, and intermediate intercooler and exhaust heat exchangers configured to transfer thermal energy to the fuel via a working fluid. The additional components are disclosed in the patent application titled, "Hybrid Expander Cycle with Intercooling and Turbo-generator" (filed concurrently with the present application), which is incorporated by reference in its entirety.

In system 50, the cryogenic liquid fuel is used to cool power electronics and compressed air entering HPC 24 and recover heat from exhaust gas to produce a high-pressure gaseous fuel used to drive turbo-generator 14 and provide fuel for combustion in combustor 26. Fuel pump 40 is configured to pump liquid fuel from tank 48 through fuel line A through cooling jacket 44 as was described with respect to system 10. Fuel pump 40 pumps the liquid fuel received from fuel tank 48 and cooling jacket 44 to intercooler 54 though fuel line B. In some embodiments, liquid fuel is used as a heat sink for vehicle or external heat load (e.g., avionics), as illustrated in FIG. 2. Pump 40 increases the pressure of liquid fuel entering intercooler 54. In some non-limiting embodiments, the pressure of fuel entering intercooler 54 from fuel pump 40 can be in excess of 550 psi (3,792 kPa). It will be understood by one of ordinary skill in the art to design pump 40 and the fuel circuit of system 50 to provide effective circulation of the fuel through system 10.

Intercooler is configured to place compressed air exiting LPC 22 and liquid fuel in thermal communication such that thermal energy from the compressed air is transferred to the liquid fuel. The temperature of the fuel is sufficiently low to provide intercooling between LPC 20 and HPC 22, but can vary significantly depending on system 50 configuration, intercooling configuration, and inlet air temperature T2. In one non-limiting example, liquid hydrogen supplied to intercooler 34 at a temperature of −350° F. (−212° C.) or lower can effectively remove heat from the compressed air exiting LPC 20. Fuel exiting intercooler 54 is pumped through fuel line C to exhaust heat exchanger 56 where heat from exhaust gas exiting gas turbine engine 52 can be transferred to the fuel to produce a high-pressure gaseous fuel capable of driving fuel turbine 38. The high-pressure gaseous fuel directed to turbo-generator 14 through fuel line D expands through multi-stage fuel turbine 38, driving rotation of fuel turbine 38 and thereby fuel pump 40 and motor/generator 42, which can be located on common shaft 46 or otherwise mechanically coupled. Gaseous fuel exiting fuel turbine 38 can be supplied to combustor 26 through fuel line E. Fuel turbine 38 is configured to maximize turbine work extraction, while providing a fuel pressure sufficient to overcome an operating pressure P3. As such, the pressure of gaseous fuel exiting fuel turbine 38 must be greater than the pressure P3 of compressed air entering combustor 26.

As illustrated in FIG. 2, intercooler 54 can be positioned to substantially surround the flow path between LPC 20 and HPC 22. Alternatively, intercooler 54 can positioned to substantially cover the air flow path between LPC 20 and HPC 24. Intercooler 54 can be a plate-fin, shell-and-tube, or other suitable air-to-liquid heat exchanger as known in the art. The temperature of fuel exiting intercooler 54 can vary depending on the temperature of the fuel and compressed air entering intercooler 54. Depending on the conditions, the fuel may remain in a liquid state or may vaporize when heated by the compressed air.

Exhaust heat exchanger 56 can be a plate-fin, shell-and-tube, or other suitable air-to-liquid heat exchanger as known in the art. As illustrated in FIG. 2, exhaust heat exchanger 56 can be located in a flow path of the exhaust gas $F_E$. Exhaust heat exchanger 56 is configured to heat fuel received from intercooler 54 with waste heat from the exhaust gas of gas turbine engine 52. In a non-limiting example, fuel exiting exhaust heat exchanger 56 and entering fuel turbine 38 can have a temperature of about 1300° F. (704° C.) and pressure of about 515 psi (3,551 kPa).

The disclosed systems 10 and 50 can use plentiful and cleaner burning fuel to achieve a higher OPR while allowing continued use of existing fan, compressor, and hot section materials; cool power components to enable reduced system losses, weight, and envelop; and generate energy using regenerative (i.e., waste heat) input with reduced impact on turbomachinery sizing, performance, and operability.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A gas turbine engine system includes a gas turbine engine and a turbo-generator. The gas turbine engine includes an air inlet configured to receive an inlet air flow; a compressor configured to compress the inlet air flow to produce a compressed air flow; a combustor fluidly coupled to the compressor and configured to combust a mixture of the compressed air flow and a gaseous fuel at a first pressure to produce a combustion gas flow; a turbine fluidly coupled to the combustor and configured to extract energy from expansion of the combustion gas flow to produce an exhaust gas flow; and a heat exchange system configured to transfer thermal energy from an air flow (i.e., inlet air flow or exhaust gas flow) to a fuel to produce the gaseous fuel at a second pressure greater than the first pressure. The turbo-generator includes a fuel turbine fluidly coupled to the heat exchange system and the combustor, a fuel pump configured to be driven by the fuel turbine and fluidly coupled to the heat exchange system, and a motor/generator configured to be driven by the fuel turbine. The fuel turbine is configured to extract energy from expansion of the gaseous fuel at the second pressure to produce the gaseous fuel at the first pressure. The motor/generator includes a cooling jacket, which is fluidly coupled to the fuel pump.

The gas turbine engine system of the preceding paragraph can optionally include, additionally and/or alternatively, any one or more of the following features, configurations, and/or additional components:

A further embodiment of the gas turbine engine system, wherein the heat exchange system can include a heat exchanger selected from the group consisting of an inlet heat exchanger and compressor intercooler.

A further embodiment of the gas turbine engine system of any of the preceding paragraphs, wherein the inlet heat exchanger can be configured to transfer thermal energy from the inlet air flow to the fuel and can be in direct fluid communication with the fuel pump.

A further embodiment of the gas turbine engine system of any of the preceding paragraphs, wherein the intercooler is disposed between a low pressure compressor and a high pressure compressor and can be in direct fluid communication with the fuel pump and configured to transfer thermal energy from compressed air exiting the low pressure compressor to the fuel.

A further embodiment of the gas turbine engine system of any of the preceding paragraphs, wherein the heat exchange system can include an exhaust heat exchanger fluidly coupled to the heat exchanger and configured to transfer thermal energy from the exhaust gas flow to the fuel received from the heat exchanger.

A further embodiment of the gas turbine engine system of any of the preceding paragraphs, wherein the fuel turbine can be in direct fluid communication with the exhaust heat exchanger.

A further embodiment of the gas turbine engine system of any of the preceding paragraphs, wherein the fuel turbine can include multiple stages and can be configured to produce the gaseous fuel at the second pressure, with the second pressure being greater than a pressure of the compressed air flow.

A further embodiment of the gas turbine engine system of any of the preceding paragraphs, wherein the fuel pump and combination motor/generator can be mechanically coupled to a rotor shaft of the fuel turbine.

A further embodiment of the gas turbine engine system of any of the preceding paragraphs, wherein the fuel pump can be in fluid communication with a cryogenic fuel.

A further embodiment of the gas turbine engine system of any of the preceding paragraphs, wherein the liquid fuel can be at a temperature below $-350°$ F. ($-212°$ C.).

A further embodiment of the gas turbine engine system of any of the preceding paragraphs, wherein the cooling jacket can be fluidly coupled between a fuel tank and the fuel pump.

A method of operating a gas turbine engine system includes cooling an air flow of the gas turbine engine via a first heat exchanger to produce a cooled air flow and compressing the cooled air flow to produce a compressed air flow. The cooling process includes transferring thermal energy to a liquid fuel. The liquid fuel is vaporized to produce a gaseous fuel. Energy is extracted from expansion of the gaseous fuel through a fuel turbine. Expansion of the gaseous fuel produces a gaseous fuel having a pressure greater than a pressure of the compressed air flow. A mixture of the gaseous fuel from an outlet of the fuel turbine and the compressed air flow is combusted in a combustor of the gas turbine engine. The method also includes cooing a combined motor/generator, which is driven by the fuel turbine.

The method of the preceding paragraph can optionally include, additionally and/or alternatively, any one or more of the following features, configurations, additional components, and/or steps:

A further embodiment of the method can further include pumping the liquid fuel to the first heat exchanger via a fuel pump driven by the fuel turbine.

A further embodiment of the method of any of the preceding paragraphs, wherein the first heat exchanger can be selected from the group consisting of a gas turbine inlet heat exchanger and a compressor intercooler.

A further embodiment of the method of any of the preceding paragraphs can further include heating fuel received from and heated by the first heat exchanger with a second heat exchanger to produce the gaseous fuel, wherein the heating process comprises transferring thermal energy from an exhaust gas of the gas turbine engine to the fuel.

A further embodiment of the method of any of the preceding paragraphs, wherein the liquid fuel can be cryogenic.

A further embodiment of the method of any of the preceding paragraphs, wherein the liquid fuel can be selected from the fuels consisting of liquid hydrogen and liquefied natural gas.

A further embodiment of the method of any of the preceding paragraphs, wherein the liquid fuel can be at a temperature below $-350°$ F. ($-212°$ C.).

A turbo-generator system includes a fuel turbine configured to extract energy from expansion of a gaseous fuel, a fuel pump configured to be driven by the fuel turbine and to deliver a liquid fuel, a motor/generator configured to be driven by the fuel turbine, with the motor/generator including a cooling jacket fluidly coupled to the fuel pump and configured to cool the motor/generator with the liquid fuel.

The turbo-generator system of the preceding paragraph can optionally include, additionally and/or alternatively, any one or more of the following features, configurations, and/or additional components:

The turbo-generator system of the preceding paragraph, wherein the fuel turbine and fuel pump can be fluidly connected to a heat exchange system of a gas turbine engine; wherein the fuel pump can be configured to deliver a liquid fuel to the heat exchange system and wherein the heat exchange system can be configured to supply the gaseous fuel to the fuel turbine; and wherein the fuel turbine can be fluidly connected to a combustor of the gas turbine engine and configured to deliver the gaseous fuel to the combustor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of operating a gas turbine engine system, the method comprising:
   receiving an inlet air flow from an inlet of a gas turbine engine of the gas turbine engine system;
   cooling the inlet air flow of the gas turbine engine via a first heat exchanger of a heat exchange system of the gas turbine engine to produce a cooled air flow, wherein the cooling comprises transferring thermal energy from the inlet air flow to a cryogenic liquid fuel;
   compressing the cooled air flow in a compressor of the gas turbine engine to produce a compressed air flow;

vaporizing the cryogenic liquid fuel to produce a gaseous fuel, wherein the cryogenic fuel is vaporized in one of the first heat exchanger or a second heat exchanger of the heat exchange system;

extracting energy from expansion of the gaseous fuel through a fuel turbine of a turbo-generator, wherein expansion of the gaseous fuel produces a gaseous fuel having a pressure greater than a pressure of the compressed air flow, wherein the fuel turbine is fluidly coupled to the heat exchange system and a combustor of the gas turbine engine;

wherein the turbo-generator further comprises:
   a fuel pump configured to be driven by the fuel turbine and to deliver the cryogenic liquid fuel to the first heat exchanger, the fuel pump being fluidly coupled to a fuel tank configured to store the cryogenic fuel and fluidly coupled to the first heat exchanger; and
   a motor/generator configured to be driven by the fuel turbine;

combusting a mixture of the gaseous fuel received from an outlet of the fuel turbine and the compressed air flow received from the compressor in the combustor of the gas turbine engine to produce a combustion gas flow, wherein the gaseous fuel from the fuel turbine is received at the combustor at a first pressure and wherein the gaseous fuel produced by the heat exchange system is at a second pressure greater than the first pressure;

extracting energy from expansion of the combustion gas flow in a turbine of the gas turbine engine, the turbine fluidly coupled to the combustor and configured to produce an exhaust gas flow, wherein the second heat exchanger is configured to transfer thermal energy from the exhaust gas flow to produce the gaseous fuel;

cooling the motor/generator, wherein the motor/generator comprises a cooling jacket fluidly coupled to the fuel tank and the fuel pump and positioned in fluid communication between the fuel tank and the fuel pump.

2. The method of claim 1, wherein the cryogenic liquid fuel is selected from the fuels consisting of liquid hydrogen and liquefied natural gas.

3. The method of claim 2, wherein the cryogenic liquid fuel is at a temperature below −350° F. (−212° C.).

4. The method of claim 1, and further comprising delivering the gaseous fuel from the first heat exchanger directly to the fuel turbine.

5. A gas turbine engine system comprising:
a fuel tank for storing a cryogenic fuel;
a gas turbine engine comprising:
   an air inlet configured to receive an inlet air flow; and
a turbo-generator system comprising:
   a fuel turbine configured to extract energy from expansion of a gaseous fuel;
   a fuel pump configured to be driven by the fuel turbine and to deliver the cryogenic liquid fuel to the gas turbine engine for combustion;
   a motor/generator configured to be driven by the fuel turbine, the motor/generator comprising a cooling jacket fluidly coupled to the fuel pump and configured to cool the motor/generator with the cryogenic liquid fuel, wherein the cooling jacket is positioned in fluid communication between the fuel tank and the fuel pump; and
   a heat exchange system in fluid communication with the fuel pump and configured to transfer thermal energy to the cryogenic liquid fuel to produce the gaseous fuel supplied to the fuel turbine, the heat exchange system comprising an inlet heat exchanger configured to transfer thermal enemy from the inlet air flow to the cryogenic liquid fuel.

6. The gas turbine engine system of claim 5, wherein the fuel turbine is fluidly connected to a combustor of the gas turbine engine and configured to deliver the gaseous fuel to the combustor.

7. The gas turbine engine system of claim 6, wherein the heat exchange system further comprises an exhaust heat exchanger, and wherein each of the inlet heat exchanger and the exhaust heat exchanger is configured to deliver the gaseous fuel directly to the fuel turbine.

8. A gas turbine engine system comprising:
a gas turbine engine comprising:
   an air inlet configured to receive an inlet air flow;
   a compressor configured to compress the inlet air flow to produce a compressed air flow;
   a combustor fluidly coupled to the compressor and configured to combust a mixture of the compressed air flow and a gaseous fuel to produce a combustion gas flow, the gaseous fuel being at a first pressure;
   a turbine fluidly coupled to the combustor and configured to extract energy from expansion of the combustion gas flow to produce an exhaust gas flow; and
   a heat exchange system, the heat exchange system comprising an inlet heat exchanger configured to transfer thermal energy from the inlet air flow to a fuel, the heat exchange system configured to produce the gaseous fuel at a second pressure greater than the first pressure; and
a turbo-generator comprising:
   a fuel turbine fluidly coupled to the heat exchange system and the combustor, wherein the fuel turbine is configured to extract energy from expansion of the gaseous fuel at the second pressure, and wherein the gas turbine engine system is configured to provide the expanded gaseous fuel from the fuel turbine to the combustor at the first pressure;
   a fuel pump configured to be driven by the fuel turbine and to deliver a cryogenic fuel, wherein the fuel pump is fluidly coupled to a fuel tank configured to store the cryogenic fuel and fluidly coupled to the heat exchange system; and
   a motor/generator comprising a cooling jacket, wherein the motor/generator is configured to be driven by the fuel turbine and wherein the cooling jacket is fluidly coupled to the fuel tank and the fuel pump and positioned in fluid communication between the fuel tank and the fuel pump.

9. The gas turbine engine system of claim 1, wherein the inlet heat exchanger is in direct fluid communication with the fuel pump.

10. The gas turbine engine system of claim 1, wherein the heat exchange system further comprises an exhaust heat exchanger fluidly coupled to the inlet heat exchanger and configured to transfer thermal energy from the exhaust gas flow to the fuel received from the inlet heat exchanger.

11. The gas turbine engine system of claim 10, wherein the fuel turbine is in direct fluid communication with the exhaust heat exchanger.

12. The gas turbine engine system of claim 10, wherein the fuel turbine comprises multiple stages.

13. The gas turbine engine system of claim 10, wherein the fuel pump and the motor/generator are mechanically coupled to a rotor shaft of the fuel turbine.

14. The gas turbine engine system of claim 8, wherein the cryogenic fuel is at a temperature below −350° F. (−212° C.).

15. The gas turbine engine system of claim 8, wherein the heat exchange system further comprises and an exhaust heat exchanger, and wherein each of the inlet heat exchanger and the exhaust heat exchanger is configured to deliver the gaseous fuel directly to the fuel turbine.

\* \* \* \* \*